US009310832B2

(12) United States Patent
Frels et al.

(10) Patent No.: US 9,310,832 B2
(45) Date of Patent: Apr. 12, 2016

(54) BACKPLANE CLOCK SYNCHRONIZATION

(71) Applicant: NATIONAL INSTRUMENTS CORPORATION, Austin, TX (US)

(72) Inventors: Jason W. Frels, Leander, TX (US); Rodney D. Greenstreet, Leadner, TX (US); Gabriel L. Narus, Austin, TX (US); Mark R. Wetzel, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 339 days.

(21) Appl. No.: 13/664,139

(22) Filed: Oct. 30, 2012

(65) Prior Publication Data
US 2014/0122915 A1 May 1, 2014

(51) Int. Cl.
*G06F 1/12* (2006.01)
(52) U.S. Cl.
CPC .......................................... *G06F 1/12* (2013.01)
(58) Field of Classification Search
None
See application file for complete search history.

(56) References Cited

U.S. PATENT DOCUMENTS 6,370,159 B1 * 4/2002 Eidson ........................ 370/503
6,950,957 B1 * 9/2005 O'Leary ...................... 713/401
2005/0193095 A1 * 9/2005 Driediger et al. ............ 709/219
2007/0217170 A1 * 9/2007 Yeap et al. ................... 361/752
2012/0204055 A1 8/2012 Paul et al.

OTHER PUBLICATIONS

Wilcox, D.R.; "Backplane Bus Distributed Realtime Clock Synchronization;" Technical Report 1400, Naval Ocean Systems Center, Dec. 1990; pp. 1-60.

* cited by examiner

*Primary Examiner* — Paul Yanchus, III
(74) *Attorney, Agent, or Firm* — Meyertons Hood Kivlin Kowert & Goetzel, P.C.; Jeffrey C. Hood; Mark S. Williams

(57) ABSTRACT

Techniques and systems for synchronizing a clock via a backplane. An apparatus includes a backplane, a clock coupled to or included in the backplane, a synchronization interface, and at least one processing element coupled to the clock via the backplane and coupled to or including the synchronization interface. The at least one processing element may be configured to compare first time information received from the clock via the backplane with second time information received from the synchronization interface. The second time information may be associated with an external clock. The at least one processing element may determine adjustment information based on the comparison and synchronize the clock with an external clock using the adjustment information, via the backplane. The apparatus may be a PXIe chassis. The clock output may be sent to modules plugged into the backplane in order to synchronize them with an external chassis clock, for example.

22 Claims, 11 Drawing Sheets

BACKPLANE CLOCK SYNCHRONIZATION

FIELD OF THE INVENTION

The present invention relates to the field of networked devices, and, more particularly, to synchronization of instrumentation systems.

DESCRIPTION OF THE RELATED ART

Instrumentation systems such as measurement and automation systems are often implemented using a chassis that allows various instrumentation modules to be plugged into slots in a backplane. The chassis and backplane are typically configured according to a particular specification such as the (Peripheral Component Interconnect (PCI) eXtensions for Instrumentation (PXI) standard or the PXI Express (PXIe) standard, for example. The PXIe standard defines electrical and mechanical backplane characteristics that allow a wide variety of companies to develop instrumentation modules that may be plugged into a PXIe backplane. Each chassis and/or backplane in an instrumentation system may include a clock whose characteristics may be defined according to such a specification. The clock (e.g., the PXIe 10 MHz backplane clock) may be routed to slots in the backplane. Modules plugged in to such slots may synchronize their internal clocks to the reference clock.

In some systems, multiple instrumentation chassis may be connected, e.g., via ethernet. In such systems, it may be desirable to discipline the clock of one chassis (i.e. a slave clock) to the clock of another chassis (i.e. a master clock), e.g., in order to synchronize the internal clocks of modules in one chassis with modules in the other chassis.

SUMMARY OF THE INVENTION

Various techniques for clock synchronization via a backplane are presented below.

In one embodiment, an apparatus includes a backplane, a clock coupled to or included in the backplane, at least one processing element coupled to the clock via the backplane, and a synchronization interface coupled to or included in the at least one processing element. In this embodiment, the at least one processing element is configured to compare first time information received from the clock via the backplane with second time information received from the synchronization interface. The second time information may be associated with an external clock. In one embodiment, the at least one processing element determines adjustment information based on the comparison and synchronizes the clock with an external clock using the adjustment information, via the backplane.

In one exemplary embodiment, the at least one processing element may include a central processing unit (CPU) and chipset, which may be coupled to the synchronization interface (e.g., a network interface controller) via a PCIe bus. In this embodiment, the backplane may be a PXIe backplane and the CPU and chipset may be coupled to the backplane via SMBus. The synchronization interface may be coupled to the external clock via a network implementing a time synchronization protocol such as IEEE 1588, white rabbit, thunderbolt, GPS, a wireless protocol, or a signal level, for example.

In some embodiments, one or more modules plugged into the backplane may synchronize their internal clocks to the backplane clock. A processing element may also send triggers to various system elements based on the synchronized backplane clock.

BRIEF DESCRIPTION OF THE DRAWINGS

A better understanding of the present invention can be obtained when the following detailed description of the preferred embodiment is considered in conjunction with the following drawings, in which.

Figure 1A:
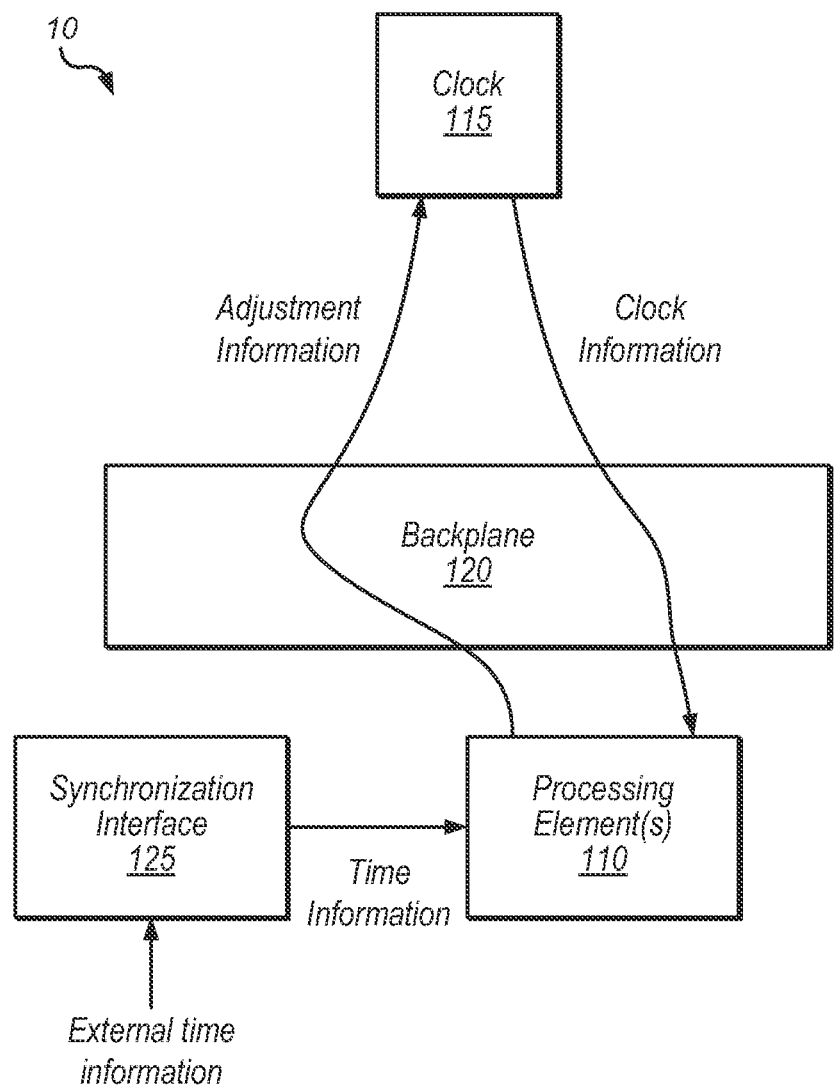
FIG. 1A is a block diagram illustrating one embodiment of a system for synchronizing a clock via a backplane.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Further, the term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Physical Diagram—A diagram which visually indicates physical connectivity between physical devices. For example, a physical diagram may visually indicate the connectivity of various physical components in a measurement system, e.g., a computer connected to a measurement device via an Ethernet network. Thus the wires in a physical diagram represent physical connectivity between devices. A physical diagram may show the corresponding "real world" physical system/devices.

Configuration Diagram—A diagram which indicates connectivity between real and/or virtual devices. A configuration diagram may visually indicate physical connectivity between physical devices as shown in a physical diagram. However, in some embodiments, one or more of the devices (or all of the devices) in the configuration diagram may be virtual or simulated devices. Thus, some or all of the devices in the configuration diagram may not be physically present in the system represented by the configuration diagram.

System Diagram—A diagram with one or more device icons and graphical program code, wherein the device icons are used to specify and/or visually indicate where different portions of graphical program code are deployed/executed. A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-Vis), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons, or that express or specify a connection or relationship between the icons (or entities represented by the icons). Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Data Flow Wire—a graphical element displayed in a diagram on a display that connects icons or nodes in the diagram and denoting that data is exchanged between the two icons or nodes.

Isochronous Data Flow Wire—a graphical element displayed in a diagram on a display that connects icons or nodes in the diagram, which denotes that data is exchanged between the two entities and that further denotes and constrains the exchange of data to occur periodically, at a fixed rate that remains constant over time. The data exchange path or transmission media (e.g., PCI bus) may be managed such that it is available to exchange the data at the appointed time, thus guaranteeing bandwidth for the transfer, and providing an upper bound for the data's arrival time (transfer latency).

Clock Disciplining Wire—a graphical element displayed in a diagram on a display that connects two clocks in a clock hierarchy, and that establishes a master/slave relationship between the two clocks.

Timed Invocation Wire—a graphical element displayed in a diagram on a display that connects two nodes or icons, where a first node or icon invokes (causes execution of) a second node or icon connected by the timed invocation wire to the first node or icon. The first node or icon determines the execution rate of the second node or icon by communicating the execution rate to the second node or icon via the timed invocation wire, or, alternatively, by sending invocation commands (or events) to the second node or icon via the timed invocation wire or by some other mechanism.

Timing Wire—a graphical element displayed in a diagram on a display that connects two entities (e.g., nodes or icons), and that implies a timing relationship between them. The timing relationship may be any of a master/slave clock disciplining relationship or an invocation timing relationship.

Invocation Timing Relationship—a relationship in which a first node or icon is connected to a second node or icon by a timed invocation wire where the execution rate of the second node or icon is controlled by the first node or icon.

Execution Rate—the number of invocations per unit time of an entity.

Execution Offset—a delay in the execution of one node or icon with respect to execution of another node or icon, where, e.g., a first node or icon is connected to a second node or icon by a timed invocation wire where the execution rate of the second node or icon is controlled by the first node or icon. The moment of execution of the second node or icon may be configured to be delayed (or offset) from the time strictly determined by the first node or icon.

Timing Generator—a node on a graphical diagram that is the source of timed invocation wires.

Timing Diagram—a graphical diagram depicting the master/slave relationships and invocation timing relationships of all the entities (e.g., nodes or icons) in a system.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Configurable Elements—Systems or devices that provide configurable functionality but do not themselves includes processors that process data. Configurable elements may produce and/or consume data that may be provided to or received from various processing elements. A configurable element may have or receive configuration data that specifies functionality of the configurable element. Configurable elements comprise data acquisition (DAQ) devices and/or other sensors/devices.

Clock—a periodic signal, e.g., as in a two valued (binary) electrical signal; an entity that can be queried for a time stamp.

Time stamp—a data representation of time; an indication of when a record was generated or acquired, e.g., in terms of a tick count of a clock, a single unit of time, e.g., seconds, or a multi-unit instant in time, e.g., year:month:day:hours:minutes:seconds:sub-seconds.

Clock Hierarchy—a collection of two or more clocks that share in a synchronization scheme such that all the clocks in the hierarchy agree on the time, where one clock operates as master clock and the others operate as slaves. The synchronization scheme may insure that all the periodic binary electrical signals in the hierarchy have a fixed phase relationship, and that all clocks return equal valued time stamps when queried at the same instant.

Phase Relationship—the relative time between like changes in value of two or more binary electrical signals. The phase relationship is 'fixed' when the relative time of these like value changes between the signals is constant over the life of the signals.

Clock Symbol—a node on a graphical diagram that represents a clock.

Master Clock—a first clock in a clock hierarchy with which the remaining clocks in the hierarchy must agree.

Slave Clock—a second clock in a clock hierarchy whose timing is forced to agree with a first clock in the clock hierarchy where the first clock is called the master clock.

Master/Slave Relationship—a first clock in a clock hierarchy forces a second clock in the clock hierarchy to agree with the first clock, including maintaining a fixed phase relationship between first and second binary valued electrical signals, and time stamp equivalency for simultaneous first and second clock time stamp queries. The first clock is the master in this relationship between the two clocks, and the second clock is the slave in this relationship.

Clock Synchronization Via Backplane Overview

As indicated above, it may be desirable to synchronize a clock associated with a backplane (e.g., of a chassis) with an external clock. As used herein the term "backplane" is intended to include its well-understood meaning in the art and refers to a mechanical entity having slots for receiving modules. A backplane is configured to provide communications between modules plugged into such slots. For example, a backplane may include a switched fabric bus configured according to a particular bus specification. A backplane may include signaling lines for transmitting analog instrumentation signals between modules. Connectors included in the backplane for coupling modules to slots in which they are inserted may be considered part of the backplane.

Referring now to FIG. 1A, one embodiment of a system 10 for synchronizing a clock via a backplane is shown. System 10 may be included in a chassis such as a PXIe chassis, although it should be noted that other types of chassis may be used as desired. In the illustrated embodiment, system 10 includes processing element(s) 110, clock 115, backplane 120, and synchronization interface 125. In this embodiment, processing element(s) 110 are configured to compare clock information received from the clock via the backplane with time information received from the synchronization interface (e.g., by determining a difference between the information). In this embodiment processing element(s) 110 are configured to determine adjustment information based on the comparison and synchronize clock 115 via the backplane using the adjustment information.

Processing element(s) 110 may be included in a system controller, e.g., in a PXIe chassis. The system controller may be embedded in the chassis, or alternatively, may be implemented on a card inserted into a slot of the chassis. In one embodiment, processing element(s) 110 include a central processing unit (CPU) and chipset. In the illustrated embodiment, processing element(s) 110 are coupled to clock 115 via backplane 120 and are also coupled to synchronization interface 125. Processing element(s) 110 may implement any of various appropriate algorithms for comparing external time information and information from clock 115 and determining adjustment information, as will be described in detail below.

As used herein, the term "processing element" refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Clock 115 may be embedded or integrated in backplane 120 or may be an add-on or plug-in module to backplane 120. The clock information sent via backplane 120 may be direct clock output, a scaled version of clock output (e.g., the clock output may be sent through a scaling circuit before being sent via backplane 120), or other clock information such as an encoded timestamp, for example. In some embodiments, the output of clock 115 is sent to all slots in the backplane in order to propagate a shared notion of time within a chassis.

As used herein, the term "embedded" includes its well-understood meaning in the art and refers to a semi-permanent coupling of a processing element or clock into a system. For example, a processing element or clock coupled via a cable or plugged into a general-purpose slot is not embedded, whereas a processing element or clock that is not intended to be removed once coupled to a system is embedded in the system (e.g. a system controller element). Embedded devices often include dedicated hardware on which may be installed dedicated programs or software. An embedded device is typically designed to perform a defined task very well. In particular, an embedded device is typically not a device with general capabilities, such as a PC, for example, loaded with one or several plug-in boards, running a Microsoft OS with generous amounts of memory, system files, utilities, etc., that can be used as a measurement system, or as an office computer, or as a Web browser, etc. Thus, for example, an embedded controller may not include display capabilities typical of home computers or workstations.

In the illustrated embodiment, processing element(s) 110 are configured to synchronize clock 115 via backplane 120 using the adjustment information. The synchronization may be performed via any of various interfaces, such as PCIe, system management bus (SMBus), another communication fabric, or a custom protocol (e.g., using PXIe triggering lines), among others. In one embodiment, the backplane may include an interface such as a calibration digital to analog converter (calDAC) to convert synchronization information sent from processing element(s) 110 via the backplane into a signal (e.g., control voltage) to control clock 115. Processing element(s) 110 may be embedded in a chassis or may be included in a separate module or connected externally to a chassis via cabling and an interface board (using MXI-Express, for example).

In the illustrated embodiment, synchronization interface 125 receives external time information and sends time information to processing element(s) 110. The external time information may be the direct output of an external clock, a scaled, multiplied, or conditioned derivation of an external clock, encoded time information, synchronization information from a network synchronization protocol, or time information from a global navigation satellite system, for example. In one embodiment, synchronization interface 125 includes an internal timekeeper (i.e., clock) and synchronizes its timekeeper with the external clock. In this embodiment, synchronization interface 125 sends time information associated with both the timekeeper and the external clock to processing element(s) 110. Synchronization interface 125 may be embedded in a system controller, or may be a stand-alone module. In one embodiment, synchronization interface 125 is included in a separate module plugged into the backplane. In another embodiment, synchronization interface 125 is included in processing element(s) 110.

Figure 1B:
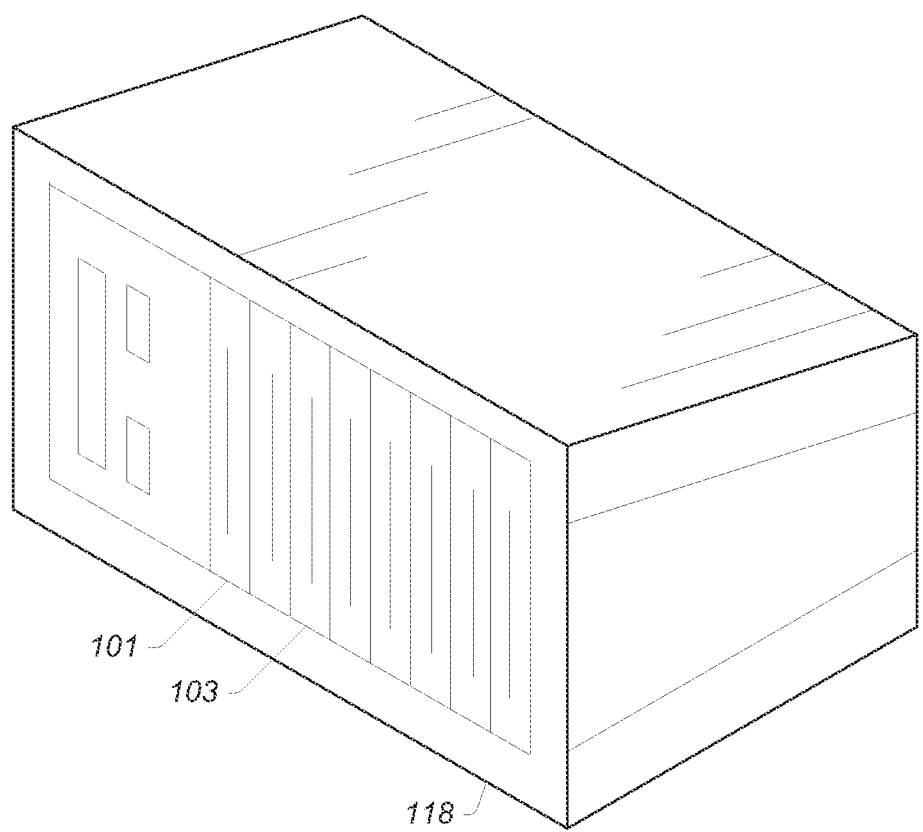
FIG. 1B is a block diagram illustrating one embodiment of an exemplary chassis.

Referring now to FIG. 1B, one exemplary embodiment of a chassis 118 is shown. Chassis 118 may include the elements of system 10, including backplane 120. In the illustrated embodiment, modules 101 and 103 have been inserted into chassis 118 and plugged into backplane 120. Chassis 118 may be mechanically and/or electrically configured according to a particular specification, such as the PXI or PXIe specification, for example. Chassis 118 may include a front panel and/or other panels, which may include connectors for coupling to other modules or devices. For example, in some embodiments, chassis 118 may be coupled to another chassis or device via synchronization interface 125 and may synchronize clock 115 to an external clock as described above with reference to FIG. 1A.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where embodiments may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Additionally, the techniques disclosed herein may be further applicable in other domains, such as, for example, audio/video applications, timed data acquisition, radio frequency applications, etc., among others.

Figure 2A:
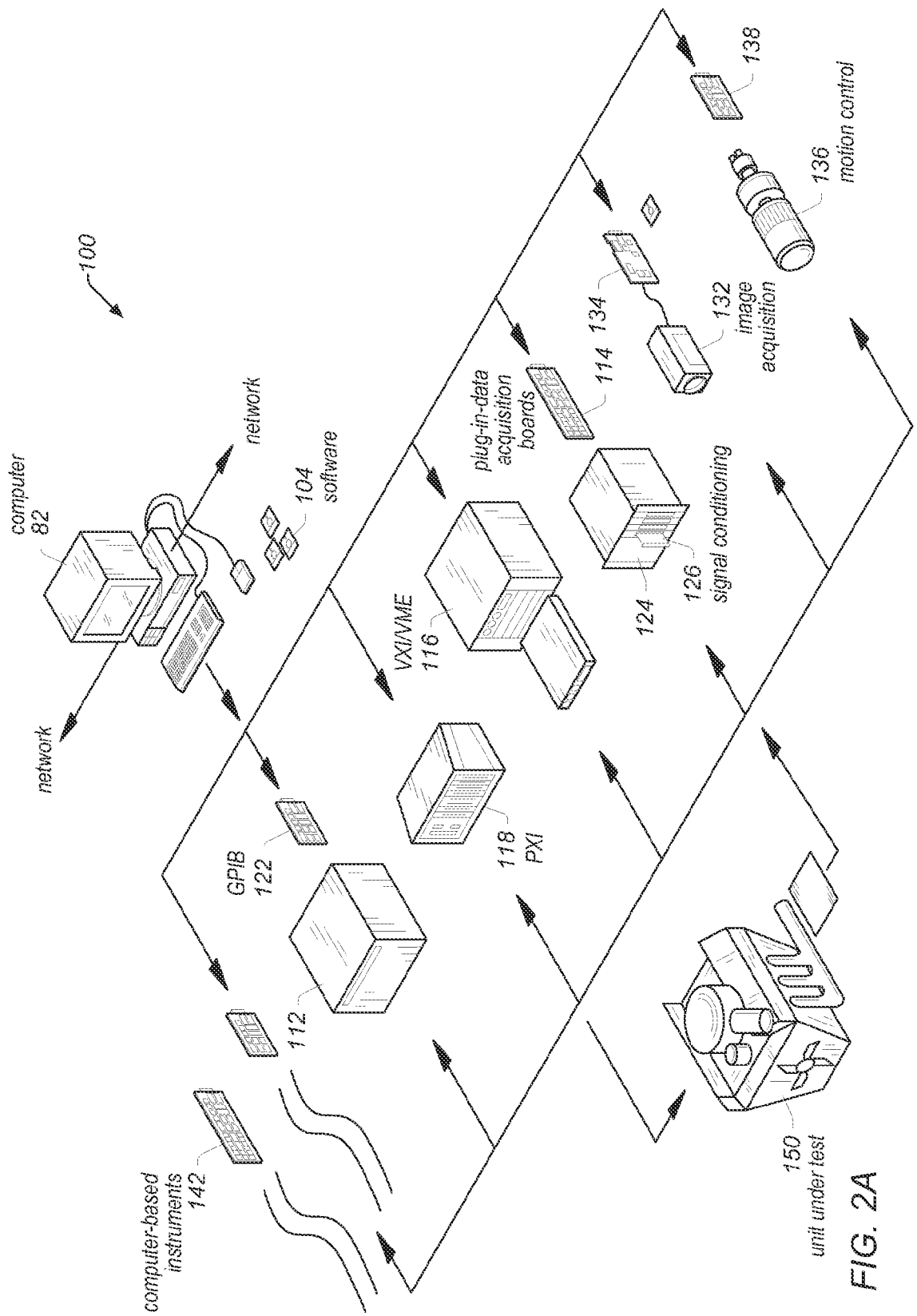
FIG. 2A illustrates an instrumentation control system which may utilize embodiments of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

Figure 4:
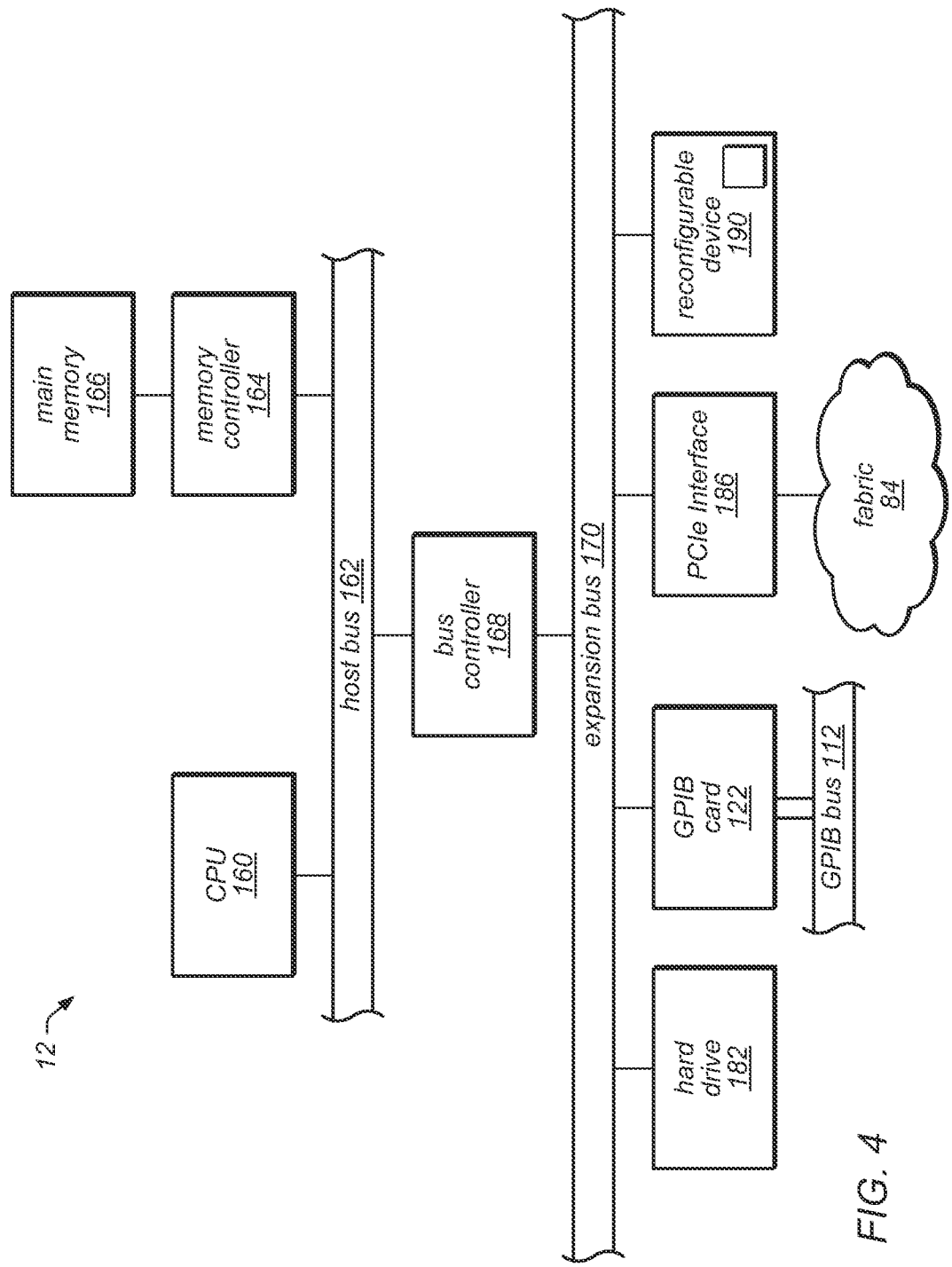
FIG. 4 is an exemplary block diagram of the computer systems of FIGS. 2A, 2B, and 3B.

The one or more instruments may include a GPIB instrument 212 and associated GPIB interface card 122, a data acquisition board 114 inserted into or otherwise coupled with chassis 124 with associated signal conditioning circuitry 126, a VXI instrument 116, a PXI instrument 218, a video device or camera 132 and associated image acquisition (or machine vision) card 134, a motion control device 136 and associated motion control interface card 138, and/or one or more computer based instrument cards 142, among other types of devices. In one embodiment, the computer 82 may couple to a switched fabric, e.g., a PCIe (Peripheral Component Interconnect (PCI) Express) based switched fabric, e.g., via a PCIe interface, as indicated in FIG. 4, and may couple to one or more instruments or other devices with respective (and different) clock domains, as discussed in more detail below.

The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
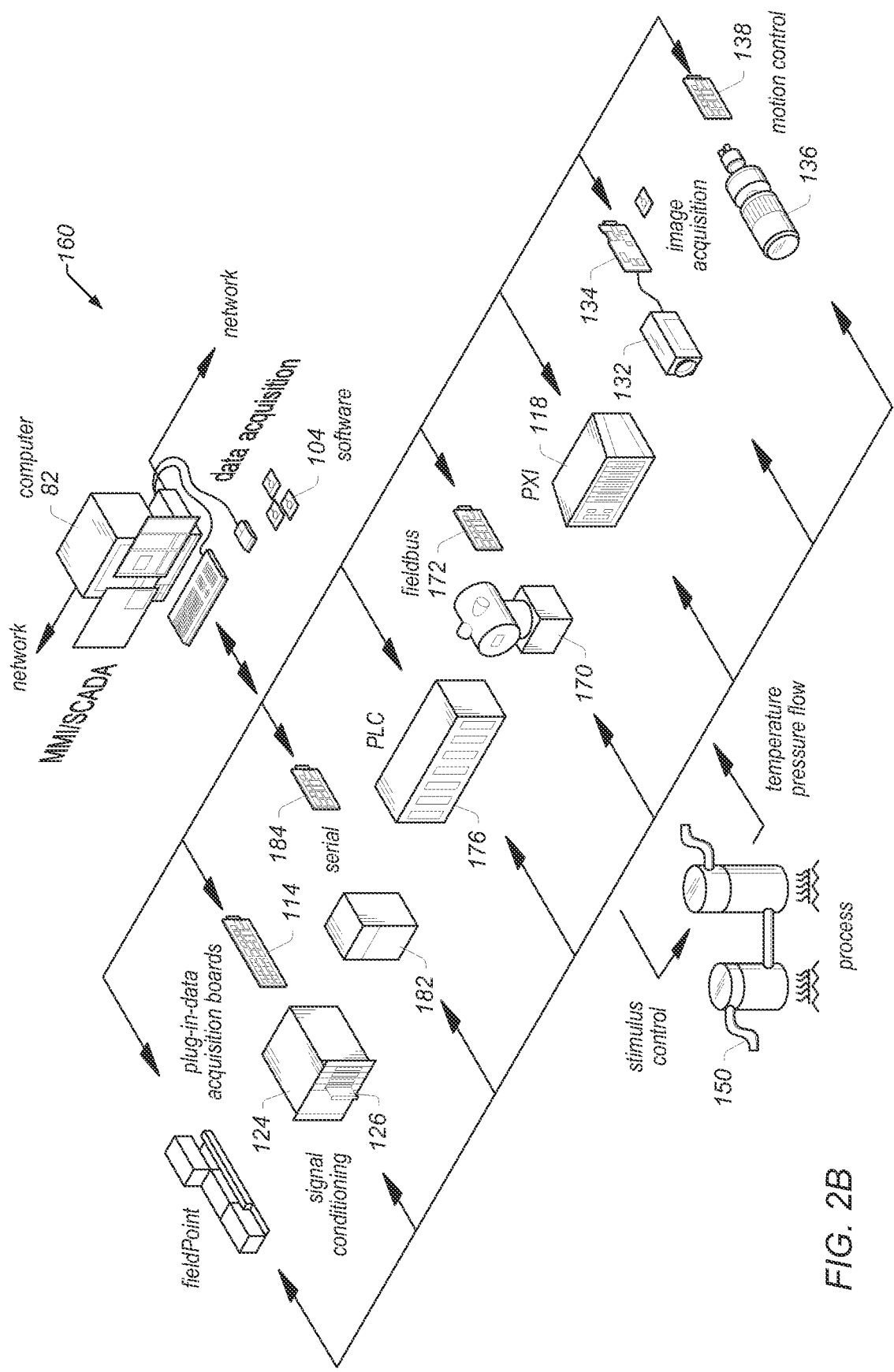
FIG. 2B illustrates an industrial automation system which may utilize embodiments of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments, possibly via a switched fabric, e.g., In one embodiment, the computer 82 may couple to a switched fabric, e.g., a PCIe based switched fabric, e.g., via a PCIe interface, as indicated in FIG. 4, and may couple to one or more instruments or other devices with respective (and different) clock domains. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 218, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
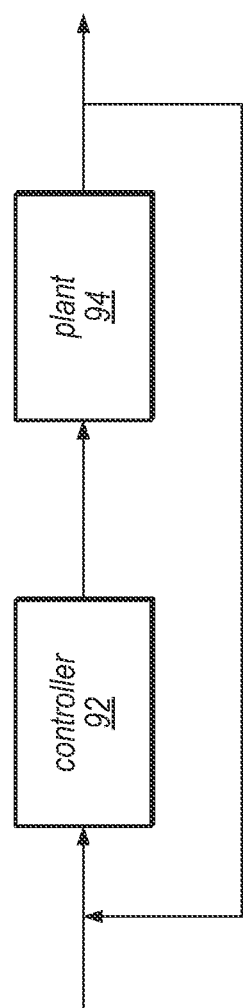
FIG. 3A is a high level block diagram of an exemplary system which may execute or utilize embodiments of the invention.

FIG. 3A is a high level block diagram of an exemplary system which may execute or utilize programs according to some embodiments. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, e.g., a graphical program, which specifies or implements the functionality of one or both of the controller 92 and the plant 94. For example, a control engineer may use a modeling and simulation tool to create a model (e.g., program) of the plant 94 and/or to create the algorithm (program) for the controller 92. Embodiments of the techniques disclosed herein may be used to synchronize components of such a system.

Figure 3B:
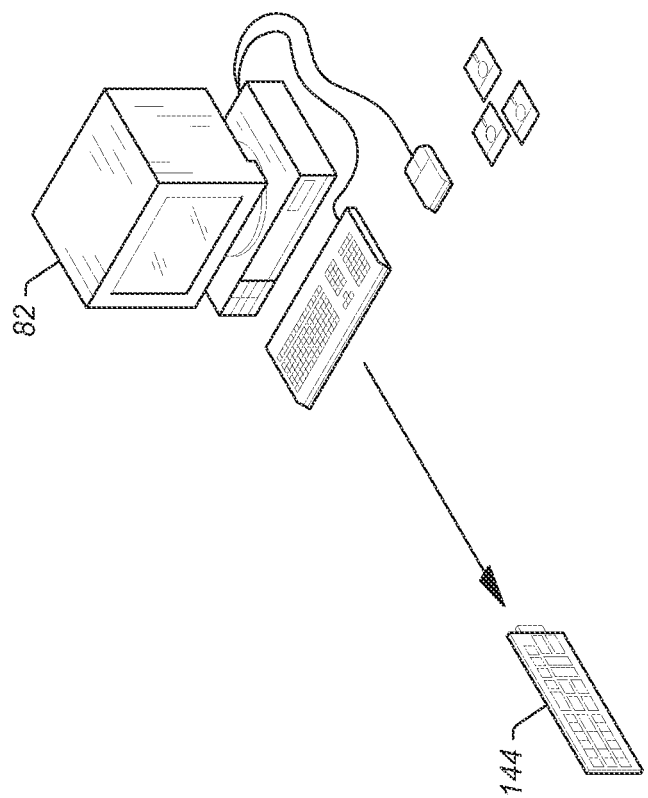
FIG. 3B illustrates an exemplary system which may perform control and/or simulation functions utilizing embodiments of the invention.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, e.g., a graphical program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. Embodiments of the techniques disclosed herein may be used to synchronize devices in such systems. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

FIG. 4—Computer System Block Diagram

FIG. 4 is a block diagram representing one embodiment of a computer system or controller, as shown in FIG. 1, 2A, or 2B, which may be used for a slave or master device, according to some embodiments. It is noted that any type of computer system configuration or architecture can be used as desired, and FIG. 4 illustrates a representative PC embodiment. It is also noted that the computer system may be a general purpose computer system, a computer implemented on a card installed in a chassis, a controller, e.g., an embedded controller, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the program(s) configured to implement embodiments of the invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 212, and/or a PCIe (Peripheral Component Interconnect (PCI) Express) interface 186 for coupling to a switched fabric 84, e.g., a PCIe based switched fabric, although other switched fabrics and interfaces may be used as desired.

As shown, a device (or multiple devices, e.g., controllers) 190 may also be connected to the computer. The device 190 may include a processor and memory which may execute a real time operating system. The device 190 may also or instead comprise a programmable hardware element. The computer system may be configured to deploy a program to the device 190 for execution. The deployed program may take the form of graphical program instructions or data structures that directly represents the graphical program. Alternatively, the deployed program may take the form of text code (e.g., C code), which may be written, or generated from a graphical program. As another example, the deployed program may take the form of compiled code generated from either the graphical program or from text code, which may itself have been generated from the graphical program.

Exemplary Synchronization Embodiment

Figure 5:
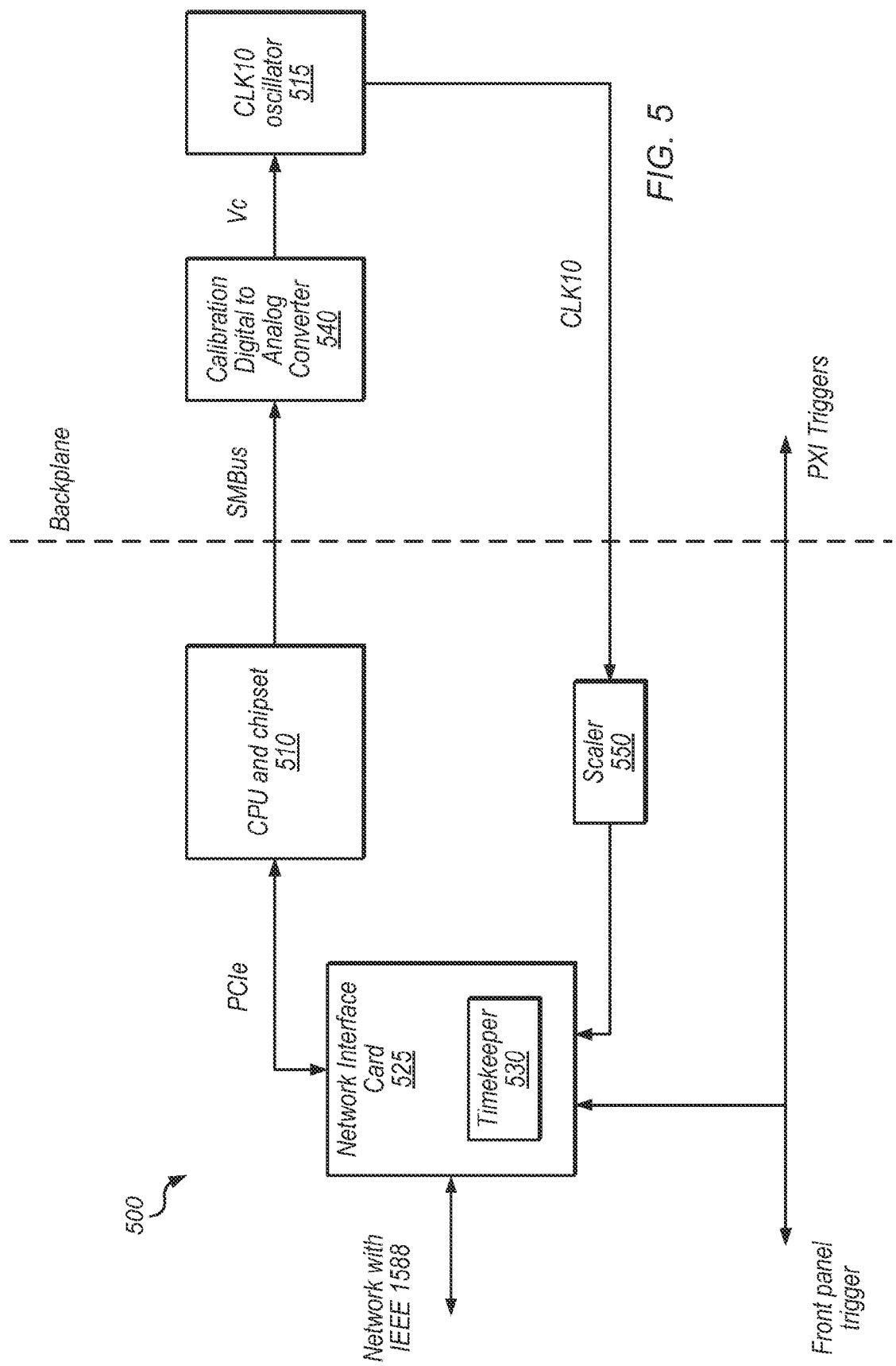
FIG. 5 is a block diagram illustrating one embodiment of an exemplary system for synchronizing a PXIe backplane clock.

Referring now to FIG. 5, one exemplary embodiment of a system 500 for synchronization of a backplane clock via the backplane is shown. The embodiment of FIG. 5 includes certain particular details for exemplary purposes, but in various embodiments other buses, configurations, standards, couplings, etc., may be implemented. In the illustrated embodiment, system 500 includes CPU and chipset 510, CLK10 oscillator 515, network interface card (NIC) 525, calibration digital to analog converter (calDAC) 540, and scaler 550. In the illustrated embodiment, system 500 is configured to synchronize CLK10 oscillator 510 with an external clock via a PXIe backplane.

In one embodiment, network interface card 525, CPU and chipset 510, and scaler 550 are included in a system controller of a PXIe chassis. In the illustrated embodiment, network interface card 525 is coupled to CPU and chipset 510 via a PCIe bus and is configured to send time information via the PCIe bus. In this embodiment, CPU and chipset 510 sends adjustment information to calDAC 540 via SMBus and calDAC 540 converts the adjustment information into a control voltage (Vc) for CLK10 oscillator 515. The output of CLK10 oscillator 515 is distributed via the backplane and sent to scaler 550. Scaler 550 scales the CLK10 output (e.g., by dividing it to a lower frequency) and sends its output to network interface card 525. This scaling may allow network interface card 525 to "keep up" with CLK10 oscillator 515, since network interface card 525 may not be configured to handle clock information at the frequency of CLK10 oscillator 515. Thus, the scaling may conserve processing resources in network interface card 525 and/or other processing elements while still allowing periodic synchronization.

Network interface card 525 is one non-limiting example of a synchronization interface. In the illustrated embodiment, network interface card 525 is coupled to an external clock via a network with the IEEE 1588 time synchronization protocol. In other embodiments, the network may implement various synchronization protocols, such as white rabbit, thunderbolt, GPS, a wireless protocol, or a signal level, for example. System 500 may be configured as a master device or a slave device in a network synchronization protocol. In the illustrated embodiment, network interface card 525 includes timekeeper 530, which is synchronized to an external clock using such a synchronization protocol. In one embodiment, network interface card 525 timestamps the output of scaler 550 using timekeeper 530. Network interface card 525 may timestamp the output of scaler 550 every N cycles of the output of scaler 550. N may be chosen such that N cycles are expected to occur every unit of time, such as every second, for example. In this embodiment, network interface card 525 sends the timestamp information to CPU and chipset 510. CPU and chipset 510 then compares the timestamp information with an expected timestamp (e.g., with respect to previous timestamps) in order to determine adjustment information for CLK10 oscillator 515.

CPU and chipset 510 may implement any of various algorithms for determining adjustment information for CLK10 oscillator 515 based on the information from network interface card 515. One embodiment of such an algorithm is described below with reference to FIG. 9. In the illustrated embodiment, CPU and chipset 510 are coupled to calDAC 540 via a bus configured according to the system management bus (SMBus) protocol. In other embodiments, other appropriate couplings are contemplated. For example, in some embodiments, a bus for system management similar to SMBus may be used. Such a bus may have a low pin count (e.g., less than 10 lines), may be a serial bus, and may be configured for use by a system controller to communicate with various elements such as calDAC 540. In another embodiment, CPU and chipset 510 may be coupled to calDAC 540 via a PCIe bus. In other embodiments, CPU and chipset 510 may be coupled to calDAC 540 via another communications fabric or via triggering lines (e.g., PXIe triggering lines and/or custom triggering lines).

As discussed above, calDAC 540 may be configured to translate adjustment information determined by CPU and chipset 510 and convert the adjustment information into a control voltage (Vc) for controlling CLK10 oscillator 515. In other embodiments, CPU and chipset 510 may be configured to provide a control voltage directly to CLK10 oscillator 515 and calDAC 540 may be omitted from system 500. In other embodiments, a clock may be configured to receive digital control signals instead of a control voltage, and CPU and chipset 510 may send adjustment information in digital form directly to the clock.

The CLK10 oscillator 515 may be a voltage-controlled oscillator whose frequency of operation may vary based on the applied control voltage Vc. The output of CLK10 oscillator 515 may be provided to slots in the backplane, and modules plugged into the slots may synchronize their clocks with CLK10 oscillator 515 (thus also synchronizing their clocks with the external clock via the network. In some embodiments, the modules may use phase locked loop (PLL) techniques to discipline their internal clocks to CLK10 oscillator 515.

In the illustrated embodiment, scaler 550 is configured to divide the output of CLK10 oscillator 515 into a lower frequency. For example, scaler 550 may change its output pulse for every N input pulses from CLK10 oscillator 515. Thus, in one exemplary embodiment in which CLK10 oscillator 515 is a 10 MHz oscillator and scaler circuit is configured to divide the output of CLK10 oscillator 515 by 10 million, the output of scaler 550 has a frequency of 1 Hz. As discussed above, network interface card 525 may timestamp each pulse from scaler 550.

Various elements of system 500 may also send triggers based on a shared notion of time. The shared notion of time may be achieved when timekeeper 530, CLK10 oscillator 515, an external clock, and/or one or more module internal clocks are synchronized. For example, in the illustrated embodiment, network interface card 525 is configured to send trigger signals (e.g., pulse or signal level) to a front panel of a PXIe chassis. In this embodiment, network interface card 525 is also configured to send PXI trigger signals to modules plugged in to the backplane via a PXI trigger bus. In one embodiment, network interface card 525 may also send triggers to external systems based on the synchronized clock. Similarly, network interface card 525 may send triggers based on information received via the network. Thus, modules in different chassis may share triggers based on a shared notion of time. In various embodiments, other elements of system 500 may send trigger signals via any appropriate bus, based on a shared notion of time achieved by synchronization of a clock to an external clock via a backplane.

Figure 6:
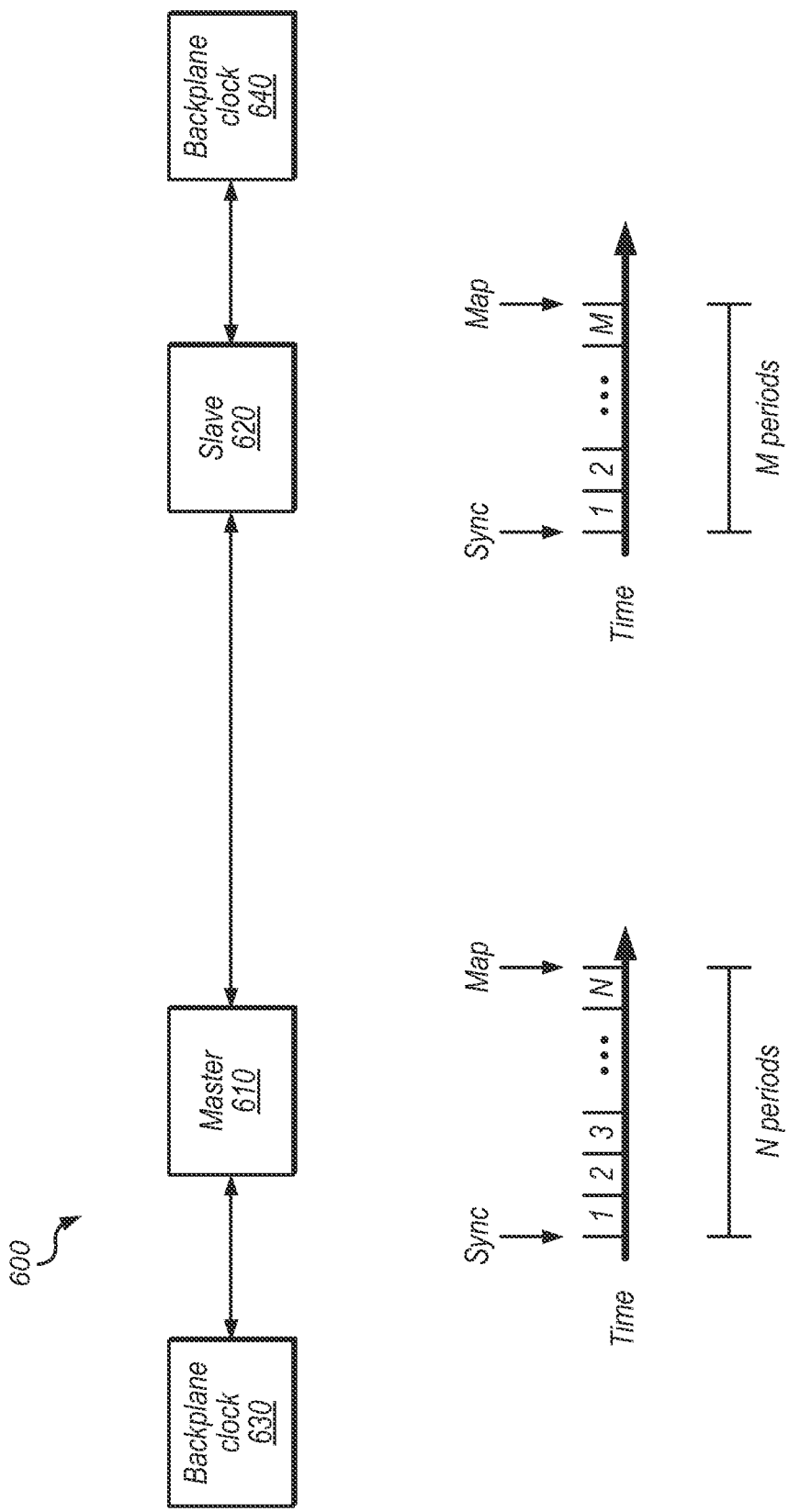
FIG. 6 is a diagram illustrating one embodiment of clock synchronization.

Referring now to FIG. 6, one embodiment of a system 600 for synchronization of backplane clocks between different devices is shown. In the illustrated embodiment, master device 610 is coupled to backplane clock 630 via a backplane and slave device 620 is coupled to backplane clock 640 via a backplane. Master device 610 and slave device 620 may be coupled via a network implementing a time synchronization protocol, as discussed above. Backplane clock 630 may be synchronized with backplane clock 640 according to the implementation described above with reference to FIG. 5. In the timing diagram, the "sync" point for both the master and slave devices is a shared synchronization point, such as a second boundary (or any appropriate synchronized point in time) according to the time synchronization protocol, for example.

In the illustrated embodiment, a synchronization interface in each of master 610 and slave 620 is configured to map or timestamp its time every time a certain number of periods of its corresponding backplane clock occur. The backplane clocks are synchronized such that the respective mapping points occur at an integer multiple of backplane clock cycles from the sync point. However, the backplane clocks may not start at the same time, thus, in the illustrated exemplary situation, master 610 maps N periods after the sync point and slave 620 maps M periods after the sync point. FIG. 6 is intended to illustrate that regardless of the relationship between M and N, because both numbers are an integer number of backplane clock periods (e.g., 100 ns for a 10 MHz clock), the edges of the backplane clocks are phase aligned. Because of the disciplining of the backplane clocks to a particular frequency (e.g., as described above with reference to FIG. 5), the backplane clocks are also frequency aligned.

In some embodiments, errors due to the time synchronization protocol, instability of the oscillators, various latencies, and/or jitter may prevent the backplane clocks from being phase aligned. This may occur, for example, when the combined error is greater than a whole backplane clock period. However, in such a situation, the backplane clocks may remain frequency aligned, which is desirable even if the clocks cannot be phase aligned.

Figure 7:
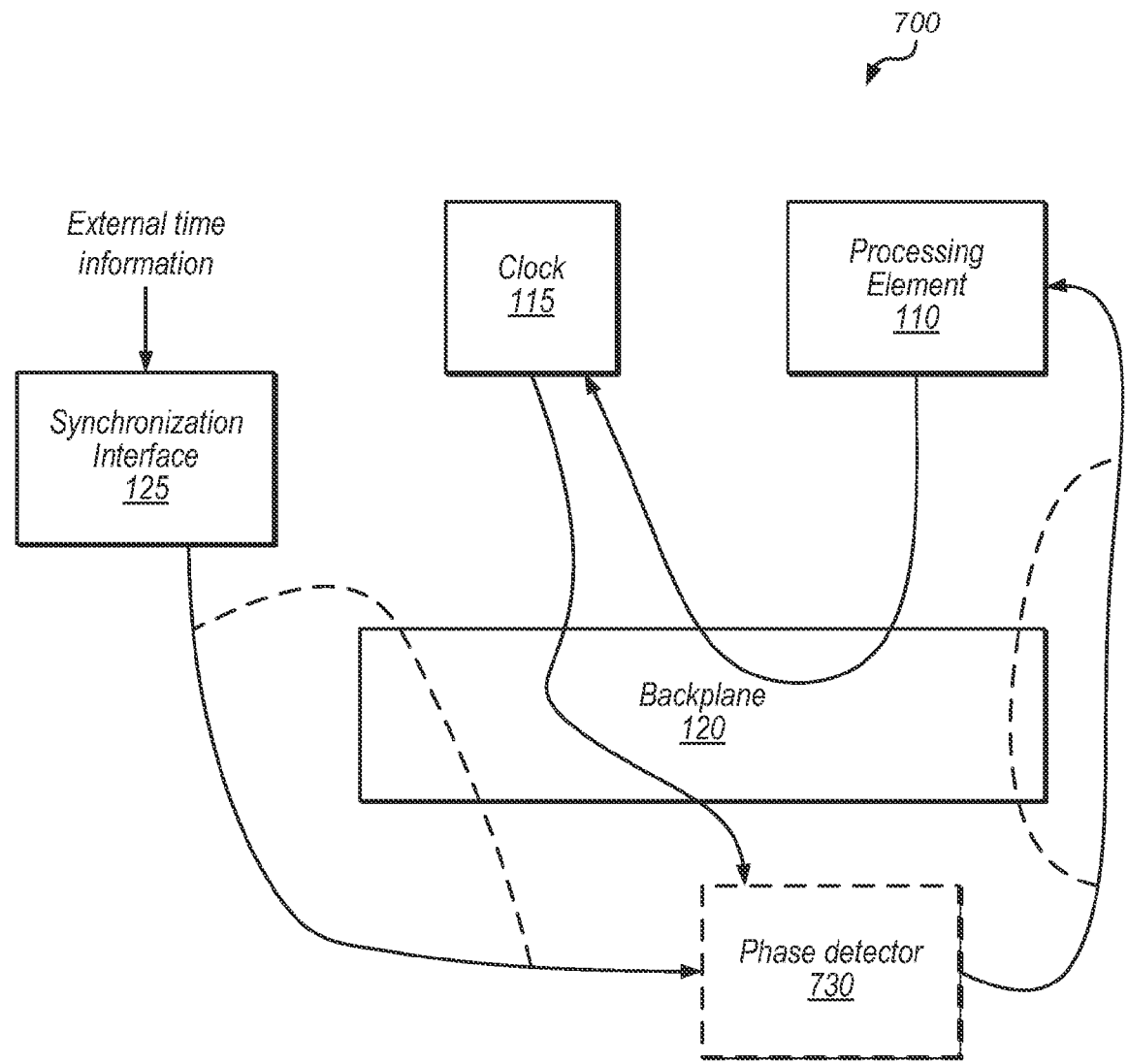
FIG. 7 is a block diagram illustrating various embodiments of system configuration.

Referring now to FIG. 7, a generalized diagram encompassing multiple exemplary embodiments of a system 700 for clock synchronization is shown. Processing element 110, clock 115, backplane, 120 and synchronization interface 125 may be configured as described above with reference to similarly numbered elements of FIG. 1A. System 700 also includes phase detector 730, which may be coupled in various configurations.

In some embodiments, phase detector 730 is configured to compare time information from clock 115 with external time information. The time information may be direct clock output, scaled clock output, encoded time information, a timestamp, etc.

In one embodiment, phase detector 730 is included in or implemented by the processing element(s) 110 of FIG. 1A. For example, in the embodiment of FIG. 5, CPU and chipset 510 perform the function of phase detector 730 by determining adjustment information based on a timestamp received from network interface card 525. In another embodiment, phase detector 730 is included in or implemented by synchronization interface 125. In yet another embodiment, phase detector 730 is a stand-alone unit. Thus, phase detector 730 may be included in or coupled to (via backplane 120 or otherwise) synchronization interface 125 which may receive external time information. Similarly, phase detector 730 may be included in or coupled to (via backplane 120 or otherwise) processing element 110, which may determine adjustment information for clock 115. Thus, comparison of time information may be performed by various processing elements. In the embodiment of FIG. 7, adjustment information is sent to clock 115 via backplane 120 and clock information is sent to phase detector 730 via backplane 120. In various embodiments, processing element 110, synchronization interface 125, and/or phase detector 730 may be embedded, may be included in plug-in modules, or may exist outside a chassis utilizing cabling and/or a cabling adaptor module (e.g., an adaptor module plugged into backplane 120 may be configured to provide a cable connection to an external element).

In the exemplary embodiment of FIG. 5, network interface card 525 is configured to receive external time information from an external clock. In other embodiments, a synchronization interface may receive time information from a non-external source. For example, the synchronization interface may receive time information from another clock within the same chassis as the backplane and synchronize clock 115 with the other clock via backplane 120.

Figure 8:
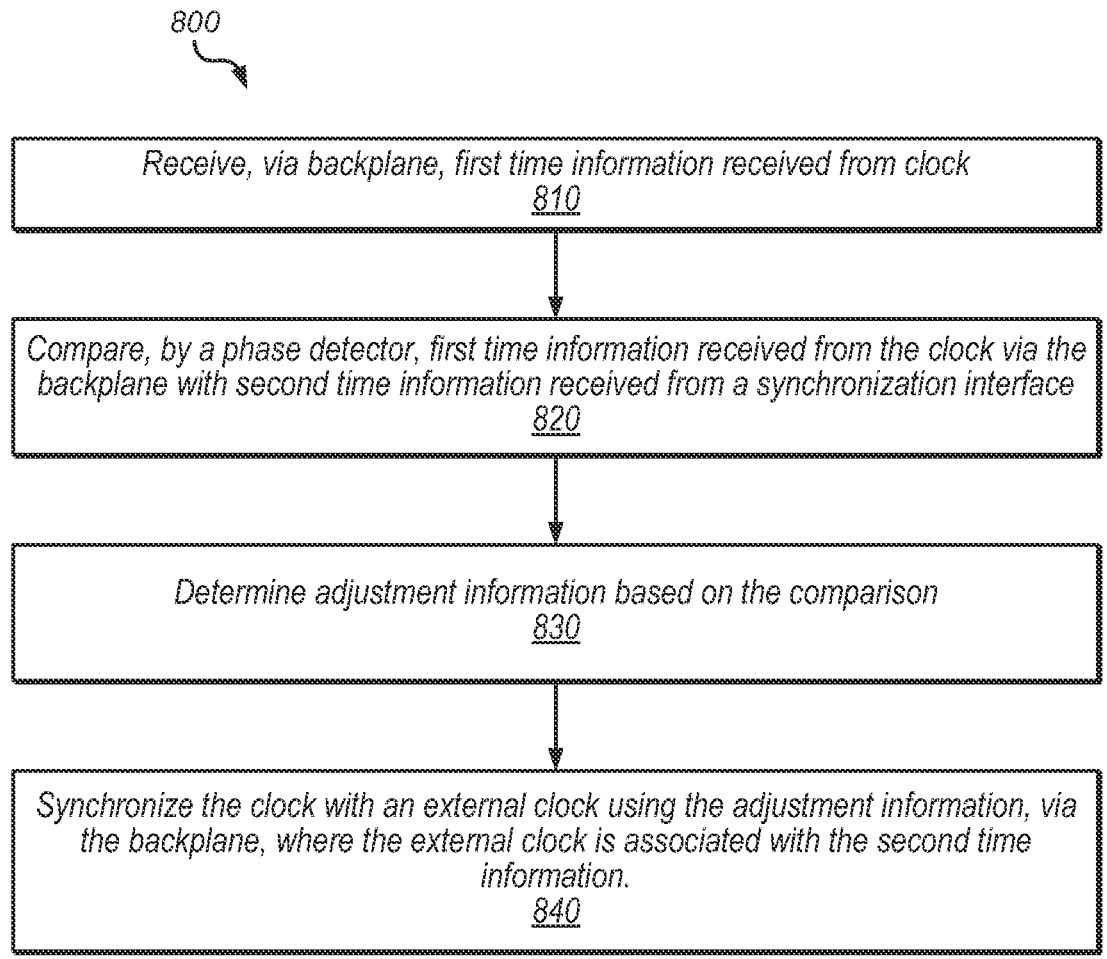
FIG. 8 is a flow diagram illustrating one embodiment of a method for synchronizing a clock via a backplane.

Referring now to FIG. 8, a flow diagram illustrating one embodiment of a method 800 for synchronizing a clock via a backplane is shown. The method shown in FIG. 8 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 810.

At block 810, first time information from a clock is received via a backplane. The first time information may be the direct output of the clock, a scaled output of the clock, encoded time information generated based on the clock (e.g., information indicating a time of 1:23 am), a timestamp or mapping associated with the clock, etc. The backplane may be a PXIe backplane. A synchronization interface in a system controller of a PXIe chassis may receive the first time information. Flow proceeds to block 820.

At block 820, a phase detector compares the first time information with second time information received from a synchronization interface. As mentioned above with reference to FIG. 7, the phase detector may be included in a processing element or the synchronization interface, or may be a stand-alone processing element. In one embodiment corresponding to FIG. 5, the phase detector is included in the CPU and chipset and compares the time information by comparing the timestamp with an expected timestamp (e.g., based on previous timestamps). In one embodiment in which the phase detector is included in the synchronization interface, the phase detector compares phase information from the clock with phase information from an external clock. Flow proceeds to block 830.

At block 830, adjustment information is determined based on the comparison. The adjustment information may indicate whether to increase or decrease the frequency of the clock in order to synchronize the clock with an external clock. In some embodiments, different algorithms may be used to determine the adjustment information depending on whether an error determined based on the first and second time information is greater than a particular threshold. Flow proceeds to block 840.

At block 840, the clock is synchronized with an external clock using the adjustment information. The synchronization is performed via the backplane. In one embodiment, a processing element sends adjustment information to a DAC in order to generate a control frequency to control the clock. The synchronized clock may be used to synchronize other clocks and/or send trigger information to various modules. Flow ends at block 840.

Figure 9:
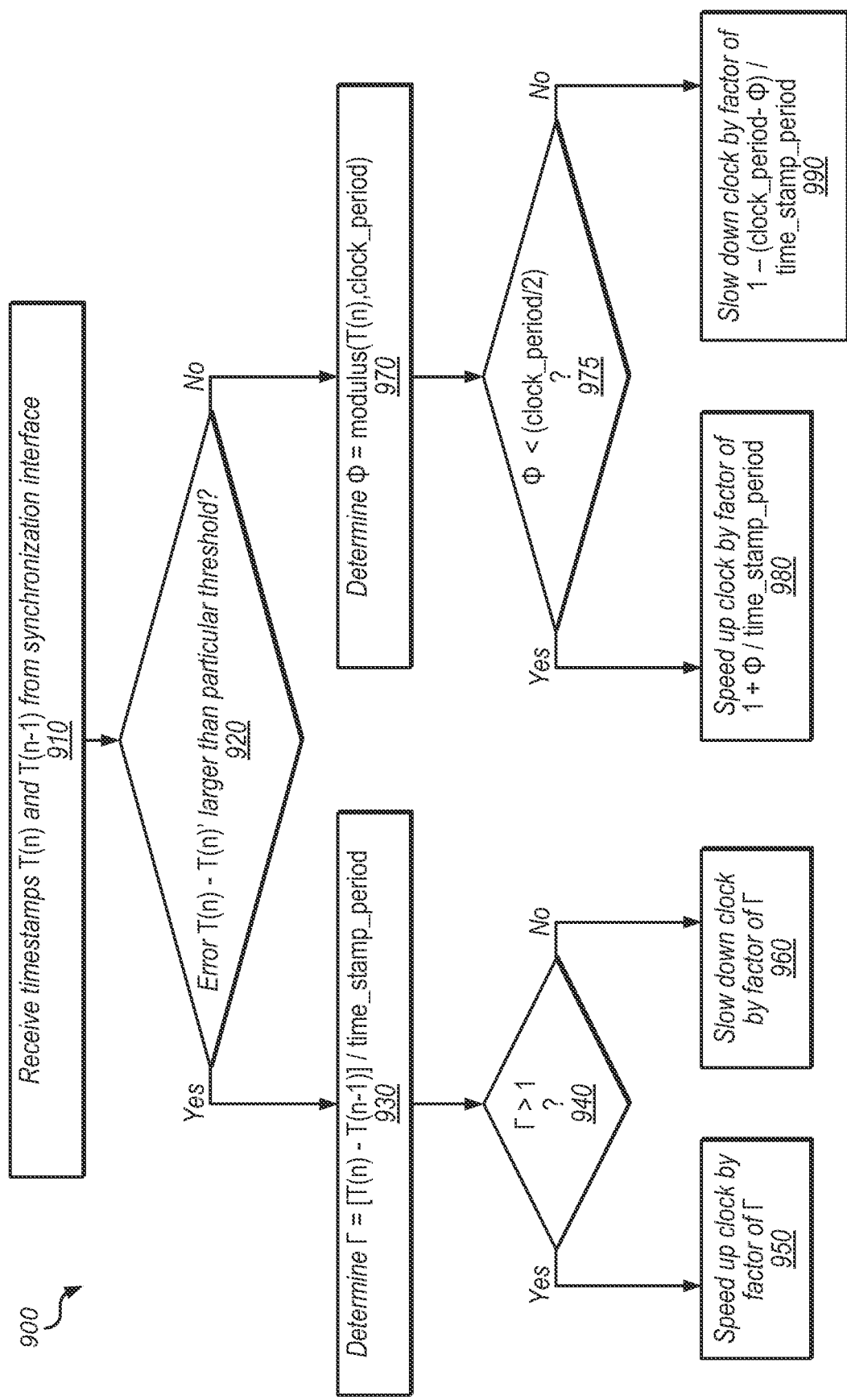
FIG. 9 is a flow diagram illustrating one exemplary embodiment of a method for determining clock adjustment information.

Referring now to FIG. 9, one exemplary embodiment of a method 900 for determining adjustment information is shown. The method shown in FIG. 9 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 910.

At block 910, timestamps T(n) and T(n−1) are received from a synchronization interface. T(n) may be a most recently received timestamp and T(n−1) may be an immediately previous timestamp prior to T(n) (e.g., no other timestamps were received between T(n) and T(n−1)). The timestamps may be generated by a synchronization interface, and may map a timekeeper of the synchronization interface to the output of the clock to be synchronized. Flow proceeds to decision block 920.

At decision block 920, it is determined whether an error T(n)−T(n)' is larger than a particular threshold. T(n)' represents an expected timestamp for T(n), e.g., based on previous timestamps such as T(n−1). For example, if the synchronization interface is configured to timestamp every second, T(n)'=T(n−1)+one second. Thus, a large error/difference between T(n) and T(n)' indicates that a larger adjustment is needed to synchronize the clock. In the illustrated embodiment, in order to decrease converge time without creating unacceptable jitter in synchronization of the clock, different algorithms are used depending on whether the error is larger than the particular threshold. The particular threshold may be determined experimentally and may vary in different embodiments. If the result of decision block 920 is yes (i.e., the error is greater than the particular threshold), flow proceeds to block 930. Otherwise, flow proceeds to block 970.

At block 930, a correction factor Γ is determined according to the equation:

$$\Gamma = [T(n) - T(n-1)] / \text{time\_stamp\_period}$$

where time_stamp_period is the expected interval between timestamps (e.g., 1 second in some embodiments). Flow proceeds to block 940.

At block 940, it is determined whether Γ is greater than 1. If Γ is greater than 1, flow proceeds to block 950. Otherwise, flow proceeds to block 960.

At block 950, the frequency of the clock is increased by a factor of Γ. For example, CPU and chipset 510 may send adjustment information to calDAC 540 in order to increase the frequency of CLK10 oscillator 515 by a factor of Γ. Flow ends at block 950.

At block 960, the frequency of the clock is decreased by a factor of Γ. For example, CPU and chipset 510 may send adjustment information to calDAC 540 in order to decrease the frequency of CLK10 oscillator 515 by a factor of Γ. Flow ends at block 960.

At block 970 (which is reached when the error is not larger than the particular threshold in block 920), a correction factor Φ is determined according to the equation:

$$\Phi = \mathrm{modulus}(T(n), \mathrm{clock\_period})$$

where clock_period refers to the period of the clock. For example, the clock_period of a 10 MHz clock is 100 nanoseconds. The modulus of the timestamp and the clock period may indicate an offset of the clock phase from a desired clock phase. Flow proceeds to decision block 975.

At decision block 975, it is determined whether Φ is less than half the clock period. If Φ is less than half the clock period, flow proceeds to block 980. Otherwise, flow proceeds to block 990.

At block 980, the frequency of the clock is increased by a factor of $$1 + \Phi/\mathrm{time\_stamp\_period}$$

Flow ends at block 980.

At block 990, the frequency of the clock is decreased by a factor of $$1 - (\mathrm{clock\_period} - \Phi)/\mathrm{time\_stamp\_period}$$

Flow ends at block 990.

Method 900 may be repeated in an iterative manner in order to maintain synchronization of a clock. In some embodiments, the results of method 900 may be filtered (e.g., using a digital PLL filter) before being applied to the clock in order to reduce jitter, for example. In some embodiments, the results of blocks 980 and 990 may be filtered while the results of block 950 and 960 may not be filtered, e.g., in order to decrease converge time when the error is larger than the particular threshold while minimizing jitter when the error is smaller than the particular threshold.

In various embodiments, any other algorithms or techniques may be used to determine adjustment information for synchronizing a clock via a backplane. The embodiment of FIG. 9 is merely intended to shown one example of a method for determining adjustment information in a timestamping implementation such as that described with reference to FIG. 5.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

We claim:

1. An apparatus, comprising:
a backplane that includes a clock, wherein the apparatus is configured to generate timestamps periodically based on the clock;
at least one processing element coupled to the clock via the backplane; and
a synchronization interface coupled to or included in the at least one processing element;
wherein the at least one processing element is configured to:
compare a first timestamp received from the clock via the backplane with a second timestamp received from the synchronization interface to determine time error information, wherein the second timestamp is generated based on an external clock;
determine adjustment information based on the time error information; and
synchronize the clock with the external clock using the adjustment information, via the backplane.

2. The apparatus of claim 1,
wherein, to synchronize the clock via the backplane, the at least one processing element is configured to send the adjustment information to the backplane via a low pin count system management bus;
wherein the backplane is configured as a PCI Express eXtensions for Instrumentation (PXIe) backplane; and
wherein the at least one processing element is coupled to the synchronization interface via a PCI Express bus.

3. The apparatus of claim 1,
wherein the apparatus includes a chassis configured to allow modules to be plugged into the backplane;
wherein an output of the clock is provided via the backplane to one or more modules plugged into the backplane; and
wherein one or more modules plugged into the backplane are configured to use the synchronized clock as a reference clock in order to maintain a shared notion of time.

4. The apparatus of claim 3,
wherein the chassis is a PXIe chassis, the backplane is a PXIe backplane, and the one or more modules are PXIe modules.

5. The apparatus of claim 1,
wherein the at least one processing element includes a scaling circuit, configured to scale an output of the clock;
wherein the synchronization interface is configured to map an output of the scaling circuit to the second timestamp; and
wherein the at least one processing element is configured to use the mapping to compare the first and second timestamp.

6. The apparatus of claim 1, wherein the synchronization interface is included in a module plugged into the backplane and is configured to send the second timestamp to the at least one processing element via the backplane.

7. The apparatus of claim 1, wherein the at least one processing element is included in a module plugged into the backplane and is configured to send the adjustment information via the backplane to synchronize the clock.

8. The apparatus of claim 1, further comprising:
a calibration digital-to-analog converter;
wherein the at least one processing element is configured to synchronize the clock by sending adjustment information to the calibration digital-to-analog converter and the calibration digital-to-analog converter is configured to convert the adjustment information to a voltage and provide the voltage to control the clock.

9. The apparatus of claim 1, wherein the at least one processing element is embedded in the apparatus.

10. The apparatus of claim 1, wherein the at least one processing element is configured to send a trigger signal based on the synchronized clock.

11. The apparatus of claim 1, wherein the at least one processing element includes:
a phase detector, configured to compare the first and second timestamp.

12. The apparatus of claim 11, wherein the phase detector is included in the synchronization interface.

13. The apparatus of claim 11, where the synchronization interface is configured to send the second timestamp to the phase detector via the backplane.

14. The apparatus of claim 1, wherein the clock is embedded in the backplane.

15. The apparatus of claim 1, wherein the synchronization interface is configured to receive the second timestamp via a network implementing a time synchronization protocol.

16. The apparatus of claim 1,
wherein the at least one processing element is configured to determine an error based on comparing the first and second timestamp; and
wherein the at least one processing element is configured to perform a first operation to determine the adjustment information when the error is greater than a particular threshold and a perform a second operation to determine the adjustment information when the error is smaller than the particular threshold.

17. A method for synchronizing a clock included in a backplane, the method comprising:
receiving, via the backplane, first time information, wherein the time information is generated based on an output clock signal from the clock;
comparing first time information received from the clock via the backplane with second time information received from a synchronization interface;
determining adjustment information based on said comparing; and
synchronizing the clock with an external clock using the adjustment information, via the backplane, wherein the external clock is associated with the second time information.

18. The method of claim 17, further comprising:
synchronizing an internal clock of a module plugged into the backplane with the clock.

19. The method of claim 17, further comprising:
sending a trigger signal based on the clock to a module plugged into the backplane.

20. The method of claim 17, further comprising:
scaling an output of the clock before said comparing.

21. The method of claim 17, wherein said synchronizing the clock with an external clock includes sending the adjustment information to a digital-to-analog converter.

22. The method of claim 17, wherein said determining adjustment information based on said comparing includes:
performing a particular operation to determine the adjustment information in response to a difference between the first and second time information being greater than a particular threshold.

* * * * *